(12) United States Patent
Kao

(10) Patent No.: US 9,034,227 B2
(45) Date of Patent: May 19, 2015

(54) METHOD OF MAKING FLEXIBLE FOAMING MEMBER FROM RECYCLED MATERIALS

(75) Inventor: Semi Kao, Huatan Township, Changhua County (TW)

(73) Assignee: SHIUN JIUG INDUSTRIAL CO., LTD., Changhua County (TW)

( * ) Notice: Subject to any disclaimer, the term of this patent is extended or adjusted under 35 U.S.C. 154(b) by 200 days.

(21) Appl. No.: 13/460,608

(22) Filed: Apr. 30, 2012

(65) Prior Publication Data
US 2012/0214884 A1 Aug. 23, 2012

Related U.S. Application Data

(63) Continuation-in-part of application No. 12/048,523, filed on Mar. 14, 2008, now abandoned.

(51) Int. Cl.
| | |
|---|---|
| *C08J 11/06* | (2006.01) |
| *B29B 17/00* | (2006.01) |
| *B29C 44/04* | (2006.01) |
| *B29C 44/10* | (2006.01) |
| *B29B 13/10* | (2006.01) |
| *B29B 15/02* | (2006.01) |
| *B29B 17/04* | (2006.01) |
| *B29B 17/02* | (2006.01) |
| *B29L 31/50* | (2006.01) |

(52) U.S. Cl.
CPC ............ *B29B 17/0042* (2013.01); *B29B 13/10* (2013.01); *B29B 15/02* (2013.01); *B29B 17/04* (2013.01); *B29B 17/02* (2013.01); *B29B 17/0412* (2013.01); *B29C 44/04* (2013.01); *B29C 44/10* (2013.01); *B29L 2031/50* (2013.01)

(58) Field of Classification Search
CPC ........ B29B 17/02; B29B 13/10; B29B 15/02; B29B 17/04; B29B 17/0424; B29B 17/0412
USPC .......................................... 264/51; 521/40.5
See application file for complete search history.

(56) References Cited

U.S. PATENT DOCUMENTS

| | | | |
|---|---|---|---|
| 6,984,670 B2 * | 1/2006 | Meyers et al. ................ 521/40 |
| 2003/0155677 A1 * | 8/2003 | Kao ............................ 264/45.1 |
| 2007/0187299 A1 * | 8/2007 | Valerio ....................... 209/12.1 |

* cited by examiner

*Primary Examiner* — Yogendra Gupta
*Assistant Examiner* — Robert J Grun
(74) *Attorney, Agent, or Firm* — Ming Chow; Sinorica, LLC

(57) ABSTRACT

The present invention provides a method of making a flexible foaming member from recycled material. The present invention relates to a production method to recycling wastes containing rubber, plastic and metal materials and pulverize them into scraps under normal temperatures, then roughly separate the various materials contained in the waste scraps into different layers based on the difference of specific gravity, and further take out the scraps of rubber and plastic materials with lower specific gravity from the waste scraps, then conduct multiple heating and pulverizations under different temperatures to produce composite-material scraps, and then using some composite-material scraps to mix flexible materials and foaming agents, then pressing the mixture into a plate-like foaming material, and conduct vulcanization and foam forming for the plates of foam material to become a elastic foam.

1 Claim, 2 Drawing Sheets

METHOD OF MAKING FLEXIBLE FOAMING MEMBER FROM RECYCLED MATERIALS

CROSS-REFERENCE TO RELATED APPLICATION

This application is a Continuation in-part of U.S. patent application Ser. No. 12/048,523 filed on Mar. 14, 2008 now abandoned which claimed a foreign priority of TW 97102732, filed on Jan. 24, 2008.

BACKGROUND OF THE INVENTION

1. Field of the Invention

The present invention relates generally to a flexible pad, and more particularly to a method of making a flexible foaming member from a recycled material.

2. Description of the Related Art

For limited natural resource of earth, there are recycling equipments in every place, such as home, school, office and other places. The recycled wastes may be remade into many products, for example, papers, fuel and the like.

Typically, the recycled materials with single material, such as PET bottles, glass products, plastics, metal products and papers, are easy to recycle than composite materials. To recycle composite material, it needs various processes to separate different material in the composite material, and then pick up specific materials for recycling. In the processes of separation of composite material, many agents and solutions are added, especially for recycling expensive materials, so that more pollution and hazard materials are produced after these processes. To separate the composite material with metal and nonmetal, the preliminary separating process usually uses the different properties, such as magnet or concentration, of metal and nonmetal. After the preliminary separating process, however, labors are the main in the following processes. It wastes time and doesn't meet the economy need.

The conventional flexible foaming member, such as insole, Yoga pad, and the like, are made of foaming material, such as natural rubber. They waste natural resource and produce pollution in the fabrication processes.

SUMMARY OF THE INVENTION

The primary objective of the present invention is to provide a method of making a flexible foaming member from a recycled material without above drawback.

The method of the present invention doesn't need to separate the recycled material into single material. Foaming agent is added into the recycled material to be a raw material that the entire recycled material may be reused to reduce waste quantity and cost of recycling, and, furthermore, it may reduce the use of natural resource.

According to the objectives of the present invention, a method of making a flexible foaming member from recycled materials, comprising the steps of: recycling: recycling wastes containing materials of rubber, plastics and metals; preliminary pulverization: pulverize the wastes into scraps under normal temperature; layering: roughly separate the various materials contained in the scraps of the wastes into different layers based on the difference of specific gravity; separating: roughly take out the scraps of rubber and plastic materials with lower specific gravity from the waste scraps; multiple heating and pulverization: conduct multiple heating and pulverizations of the waste scraps containing rubber and plastic materials under different temperatures so as to turn waste scraps into composite-material scraps; mixing: using some composite-material scraps to mix flexible materials and foaming agents; pressing the mixture into a plate-like foaming material; and vulcanizing the plate-like foaming material to become a elastic foam.

DETAILED DESCRIPTION OF THE INVENTION

Figure 1:
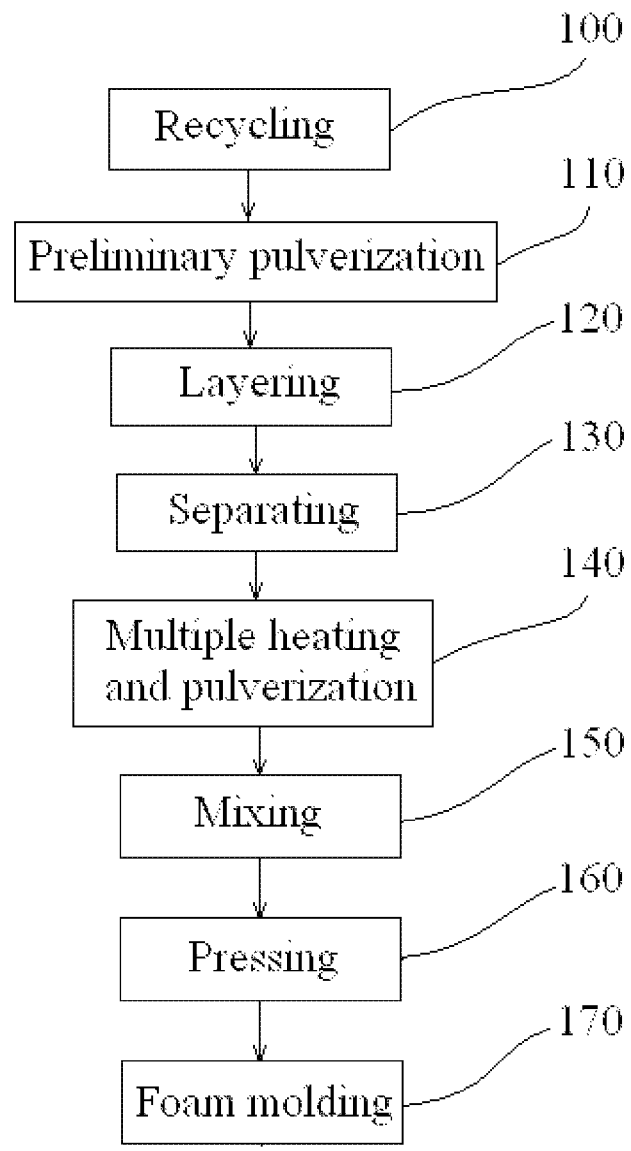
FIG. 1 is a flow chart of a preferred embodiment of the present invention.
Figure 2:
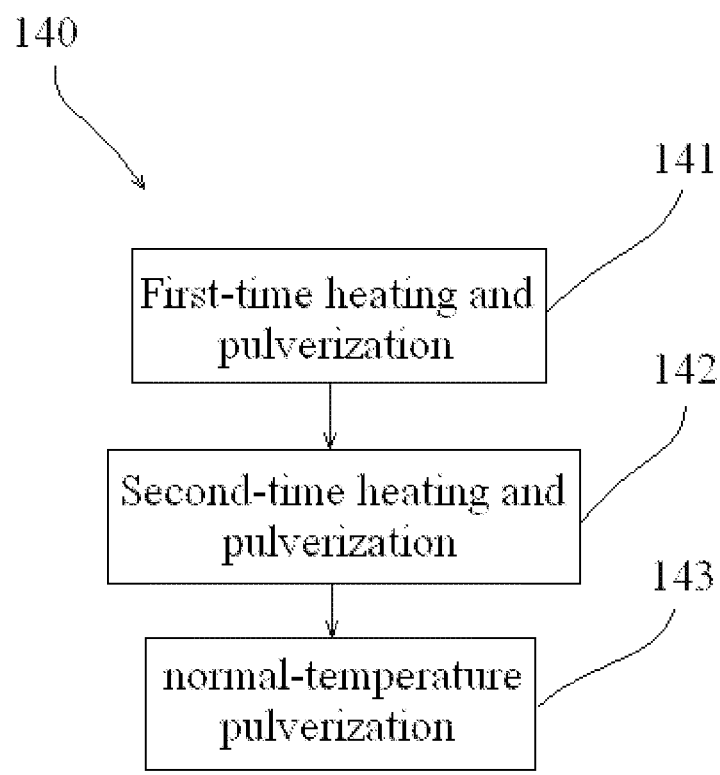
FIG. 2 is a part flow chart of the preferred embodiment of the present invention.

Referring to FIGS. 1 and 2, the first step of the present invention is recycling 100: wastes having rubber, plastic, metal, and so on, such as shoes, are recycled.

The second step of the present invention is preliminary pulverization 110: use known shredding machines to pulverize the wastes into scraps under normal temperature, which means around 25° C.

The third step of the present invention is layering 120: through a vibration method, causing the waste scraps to be automatically separated into different layers of materials of different weights based on the difference of specific gravity, with the heavier metals on the bottom and lighter fibers on the top.

The fourth step of the present invention is separating 130: roughly take out the rubber and plastic materials of lower weights from the waste scraps and leave the waste scraps on the bottom containing metal materials.

The fifth step of the present invention is multiple heating and pulverization 140: conduct multiple pulverizations of waste scraps containing rubber and plastic materials under different temperatures, including a first-time heating and pulverization 141 step, a second-time heating and pulverization 142 step and a normal-temperature pulverization 143 step, with the temperature of step of the first-time heating and pulverization 141 is 80° C., and the temperature of step of the second-time heating and pulverization 142 is 150° C., and normal-temperature referring to 25° C., so that the various plastic materials contained in the waste scraps can be respectively melted under different temperatures. Further, blend the plastic materials with rubber materials and pulverize the mixture into composite-material scraps, and meanwhile sterilize the waste scraps under higher temperatures.

The sixth step of the present invention is mixing 150: use some composite-material scraps to mix flexible materials and foaming agents. To make a flexible foaming member for insole, exercise pad, or Yuga pad, the flexible material may be natural rubber (NR), polyurethane (PU), polyvinyl chloride (PVC), polyethylene (PE), styrene butadiene rubber (SBR), and the other relative flexible materials. The foaming agent may be an organic foaming agent. The chosen groups and ratio of the pieces of the recycled materials determine the property of the flexible foaming member, so we choose predetermined groups of the pieces, such as rubber, plastic, fiber, and metal in a predetermined ratio, to make the flexible foaming member with predetermined property.

The seventh step of the present invention is pressing 160. A conventional pressing machine is incorporated to press the mixed raw material to a plate-like foaming material.

The last step of the present invention is foam molding 170. A conventional vulcanization foaming box is incorporated to foam molding the plate-like foaming material to become elastic foam.

The method of the present invention provides the composite-material scraps and the flexible materials bonded together by the gas pressure generated in the chemical reaction of foaming agent that no glue is involved in the processes. It doesn't have to separate the recycled material into single material in the present invention that most of the recycled material may be used in the present invention to cost down the recycling work.

In conclusion, the method of the present invention provides the recycled scraps and flexible materials bonding together by gas pressure of chemical reaction in vulcanization that no glue is involved in the present invention. The recycled materials used in the present invention don't need to separate into single materials that most parts of the recycled materials may be used in the present invention to reduce the waste quantity and cost down the recycling work.

The description above is a few preferred embodiments of the present invention and the equivalence of the present invention is still in the scope of the claim of the present invention.

What is claimed is:

1. A method of making a flexible foaming member from recycled materials, comprising the steps of:
   recycling: recycling wastes containing materials of rubber, plastics and metals;
   preliminary pulverization: pulverize the wastes into scraps under normal temperature 25° C.;
   layering: through a vibration method, causing the waste scraps to be automatically separated into different layers of materials of different weights based on the difference of specific gravity, with the heavier metals on the bottom and lighter fibers on the top;
   separating: roughly take out the scraps of rubber and plastic materials with lower specific gravity from the waste scraps;
   multiple heating and pulverization: conduct multiple heating and pulverizations of the waste scraps containing rubber and plastic materials under different temperatures;
   wherein the multiple heating and pulverization steps includes continuous steps of first-time heating and pulverization, second-time heating and pulverization and normal temperature pulverization, with the temperature of said second-time heating and pulverization higher than that of said first-time heating and pulverization, so that various plastic materials in the waste scraps can be melted in turn under different temperatures and be mixed with the rubber material to be pulverized into composite-material scraps;
   wherein said normal-temperature being 25° C.;
   wherein the temperature of step of said first-time heating and pulverization being 80° C.;
   wherein the temperature of step of said second-time heating and pulverization being 150° C.;
   mixing: mixing some composite-material scraps and flexible materials and foaming agents into a mixture;
   pressing: pressing the mixture into a plate-like foaming material; and
   foam molding: vulcanizing the plate-like foaming material to become elastic foam.

* * * * *